United States Patent
Parks

(10) Patent No.: US 6,190,438 B1
(45) Date of Patent: Feb. 20, 2001

(54) MIST ELIMINATOR

(75) Inventor: Clinton R. Parks, Hamilton, OH (US)

(73) Assignee: Thermo Black Clawson Inc., Middleton, OH (US)

( * ) Notice: Under 35 U.S.C. 154(b), the term of this patent shall be extended for 0 days.

(21) Appl. No.: 09/331,863

(22) PCT Filed: Dec. 29, 1997

(86) PCT No.: PCT/US97/23894

§ 371 Date: Jun. 24, 1999

§ 102(e) Date: Jun. 24, 1999

(87) PCT Pub. No.: WO98/29179

PCT Pub. Date: Jul. 9, 1998

Related U.S. Application Data

(60) Provisional application No. 60/035,730, filed on Jan. 2, 1997.

(51) Int. Cl.[7] .................................................. B01D 45/12
(52) U.S. Cl. ............................. 95/269; 55/385.1; 55/423; 55/396; 55/456; 55/457; 162/189
(58) Field of Search ............................. 95/269; 55/385.1, 55/396, 423, 456, 457, 286, 392, 394, 395, 466; 162/189

(56) References Cited

U.S. PATENT DOCUMENTS

| | | |
|---|---|---|
| 2,393,112 | 1/1946 | Lincoln . |
| 2,506,298 | 5/1950 | Griffen . |
| 3,778,980 | 12/1973 | Vancini . |
| 4,015,960 | 4/1977 | Nutter . |
| 4,154,644 * | 5/1979 | Ericcson .................................. 162/60 |
| 4,239,513 | 12/1980 | Paul et al. . |
| 4,349,360 | 9/1982 | Schuurmans et al. . |
| 4,364,754 | 12/1982 | Diachuk . |
| 4,382,807 | 5/1983 | Diachuk . |
| 4,460,386 | 7/1984 | Diachuk . |
| 4,629,481 | 12/1986 | Echols . |
| 4,838,906 | 6/1989 | Kiselev . |
| 5,300,132 | 4/1994 | Konijn . |
| 5,391,294 | 2/1995 | Mercier . |
| 5,462,585 | 10/1995 | Niskanen et al. . |
| 5,496,394 | 3/1996 | Nied . |

* cited by examiner

Primary Examiner—Duane S. Smith
(74) Attorney, Agent, or Firm—Biebel & French

(57) ABSTRACT

Improved mist eliminator for use in pulp washers and the like, and method of use of such is disclosed. A cyclonic gas/liquid separator for a gas/liquid mixture flowing vertically upward therethrough includes a cylindrical housing, a top wall having a gas outlet, a gas/liquid inlet, and a cyclonic-flow-inducing vane assembly spanning the inlet. The improvement includes an annular wall transverse to the vane assembly positioned between the vane assembly and the housing. The annular wall, in combination with the vane assembly and housing, defines an annular volume wherein separated liquid may drain downwardly toward the annular wall substantially without resistance from the gas/liquid flow. A drain carries the separated liquid directly to a liquid reservoir.

13 Claims, 4 Drawing Sheets

MIST ELIMINATOR

This application is a 371 of PCT/VS/97/23894 filed Dec. 29, 1997 and claims priority to provisional application No. 60/035,730 filed Jan. 2, 1997.

BACKGROUND OF THE INVENTION

The present invention relates to an apparatus for the separation of gas and liquid from a flow mixture of gas and liquid. In particular, the invention relates to an improved gas/liquid separator of the cyclonic variety.

In various industrial processes, such as in washing wood pulp, it is advantageous to draw air from over a reservoir of liquid by means of a vacuum provided by a blower intake. The air is usually drawn through the blower and provided under pressure to a portion of an apparatus, such as a pulp washer, to create a region of positive pressure. However, the air drawn by the vacuum created by the blower may have liquid or solid particles entrained therein, particularly where the liquid has foam or froth covering its surface. For proper operation of the blower and the apparatus, it is necessary to separate the entrained particles from the air before the air is taken in by the blower.

Various means of separating a gas from a gas/liquid flow mixture are known in the art. In particular, separation of liquid and solid particles from gas streams by cyclonic action is known. For example, a contact-and-separating element of a vortex tray of a liquid-gas mass-transfer apparatus using cyclonic separation is disclosed in U.S. Pat. No. 4,838,906 to Kiselev. Similarly, a dust collection system using cyclonic separation is disclosed in U.S. Pat. No. 2,393,112 to Lincoln.

In a typical cyclonic separator, a gas mixture having particles entrained therein is drawn vertically upward. A cyclonic rotation is imparted to the flowing mixture, typically by means of helical or spiral vanes. Centrifugal force causes heavier particles to be forced radially outwardly toward the outer periphery of the flow mixture where the particles drop back downward under the force of gravity. The gas mixture without the heavier particles continues upwardly.

Cyclonic gas/liquid separators may be used in a flat bed wood pulp washer generally similar in construction and mode of operation to a Fourdrinier paper machine incorporating an endless foraminous belt ("wire"), a headbox which delivers the pulp suspension in a pulping liquor to one end of a horizontally traveling upper run of the wire, successive washing zones along the length of the run, and means at the downstream end of the run for receiving and removing the resulting washed pulp. Pulp washers of this type, manufactured by the assignee of the present invention in accordance with Ericsson U.S. Pat. No. 4,154,644 of 1979, have been notably successful, and the present invention was developed to improve the operation and results obtained by such pulp washers.

The operation of a pulp washer of this type may be described as being according to the displacement washing principle. That is, once the pulp mat has been formed, it is not rediluted, but simply is subjected to repeated washings by application on top of the mat of washing liquid with the liquid applied in each washing zone having a lower concentration of liquor than the filtrate from the preceding zone. The liquid applied in each zone enters the mat substantially en masse and thereby displaces the liquid which was carried into the zone in the mat and causes it to drain therefrom through the wire.

Among the mechanical elements of a washer according to the Ericsson patent is a hood which encloses the entire apparatus downstream from the headbox, and a series of receptacles below the operating run of the wire in sealed relation with the hood. In operation, vacuum is applied to the receptacles, and/or gas pressure is developed within the hood, to augment the action of gravity in forcing the washing liquid through the pulp mat on the wire. Gases and vapors drawn through the wire into the upper spaces in the receptacles are recycled back to the hood to increase the pressure differential above and below the wire.

In the pulp washer, a gas/liquid separator or mist eliminator is attached to each of the receptacles at a gas outlet on top of the receptacle to thereby permit the gases and vapors to be drawn from the flat top receptacles through the mist eliminator to the suction side of a pump or fan that recycles the gas, in this case air, to the hood. However, entrained within the gases and vapors drawn from the receptacle are particles of mist and foam from the space between the wire and the pulping liquor.

Prior art mist eliminators employing cyclonic separating means have been used to remove particles of mist and foam from the gas flow before the gas reaches the pump or blower. The typical mist eliminator has a cylindrical housing arranged vertically proximate the top of the receptacle with a vacuum line attached to the top end. The gas inlet is positioned above the level of the liquor with cyclonic-flow-inducing means, typically helical vanes or a swirler, positioned within the inlet. Droplets of mist and particles of foam are hurled radially outwardly by centrifugal force from the gas/liquid flow to drop back down into the liquor under the force of gravity.

However, in many cases the upward draft of gas through the mist eliminator impinges upon the falling, separated liquid droplets. This tends to retard the separation of undesired droplets of mist and particles of foam entrained within the gas flow. Thus, incomplete separation of foreign matter from the gas results. Mist and foam entrained within the gas flow result in a lower pressure differential being developed between the hood and the receptacle, thereby reducing the efficiency of the pulp washer. Accordingly, there is a need for a mist elimination apparatus and system wherein enhanced separation of mist and foam from gas is achieved especially where the separated water droplets do not have to flow against the counter current air movement over an appreciable length of the separator.

SUMMARY OF THE INVENTION

These and other objects of the invention are met by the provision of a mist elimination system in which the gas/liquid separation devices, typically centrifugal liquid/gas separators, have an annular wall coaxial with and transverse to the cyclonic-flow-inducing vane assembly, positioned between the vane assembly and the housing. At least one drain extends from the annular wall to below the surface level of the liquor in the receptacle to drain the separated mist and foam particles back into the liquor. The annular wall, vane assembly, and housing define a chamber having a substantially annular cylindrical region wherein droplets of mist and foam separated from the gas flow may travel downwardly toward the drain with reduced resistance from the counter flowing gas. Accordingly, improved mist and foam elimination from the gas flow is effected.

Other objects and advantages of the invention will be apparent from the following description, the accompanying drawings and the appended claims.

DETAILED DESCRIPTION OF THE PREFERRED EMBODIMENT

Figure 1:
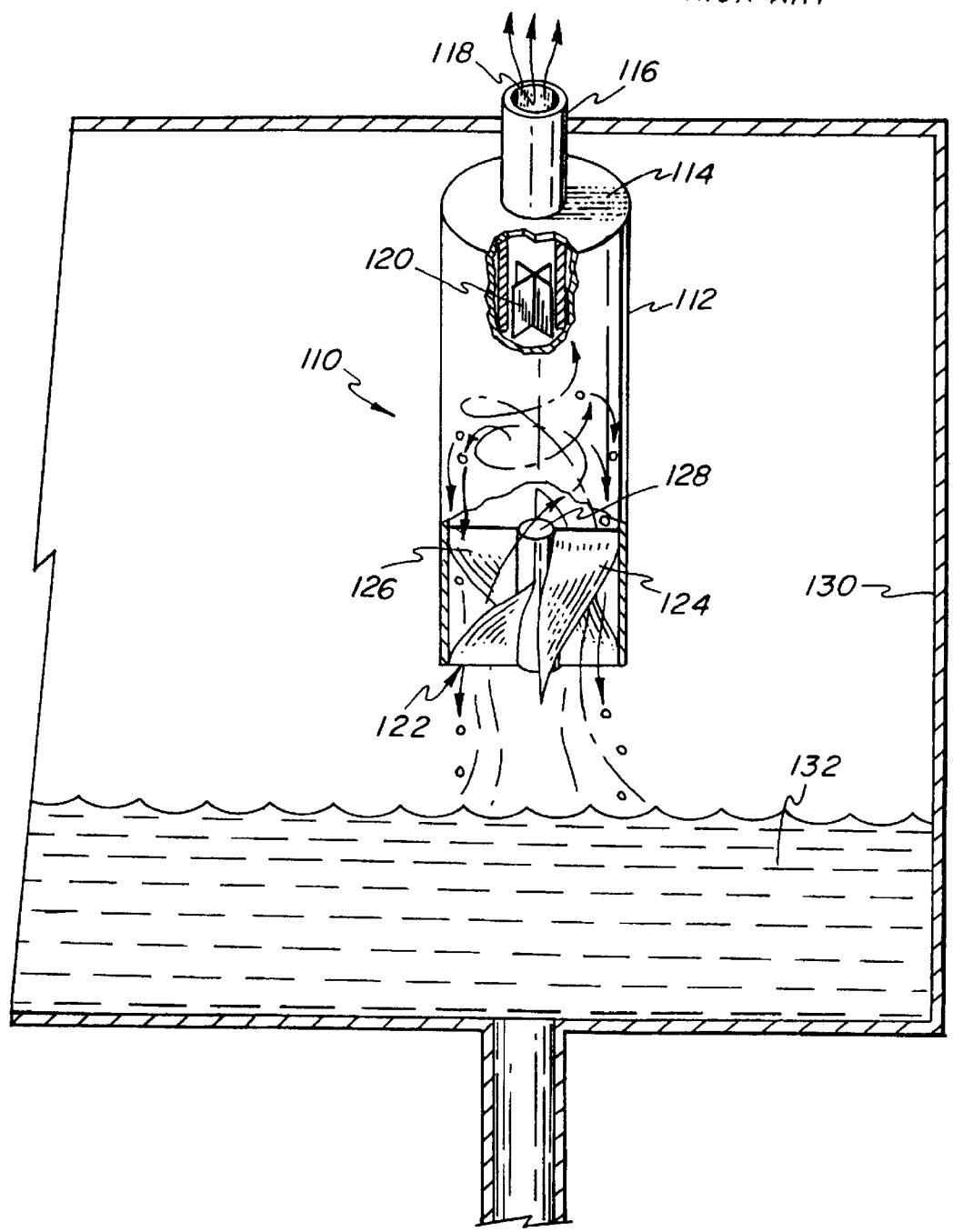
FIG. 1 is a view in side elevation of a prior art mist eliminator.

Turning first to FIG. 1, there is shown a typical prior art mist eliminator. As shown, the mist eliminator 110 comprises a cylindrical housing 112 having a top wall 114 at an upper end with an axial tube 116 defining a gas outlet 118 therein. Positioned within tube 16 are flow-straightening baffles 120. The mist eliminator 110 is oriented vertically with a gas/liquid inlet 122 oriented downwardly. Positioned within the inlet 122 coaxially with the tube 116 is a vane assembly 124 including at least one helical vane 126 surrounding cylindrical core 128. As shown, the mist eliminator 110 is mounted in a receptacle 130 of a pulp washer above a reservoir of pulping liquor 132.

In operation, a vacuum is applied to inlet 118 by the intake of a fan or blower (not shown). Gases or vapors bearing particles of mist and foam are drawn from the space above the liquor 132 into the inlet 122. As the gas/liquid mixture is drawn upwardly through the vane assembly 124, a swirling or cyclonic motion is imparted to the flow mixture. As the swirling gas/liquid mixture flows upwardly, centrifugal force causes the heavier mist and foam particles to move radially outwardly toward the housing 112 where the particles then tend to travel downwardly under the force of gravity back toward the reservoir of liquor 132.

However, the particles flowing downwardly through the vane assembly 124 encounter the upwardly flowing gas/liquid mixture drawn in through the inlet 122. Thus, some of the particles moving downwardly become caught up in the flow mixture and are carried upwardly toward the outlet 118. As the exiting gases or vapors are drawn through tube 116, the swirling flow is rendered substantially axial by baffles 120.

Figure 2:
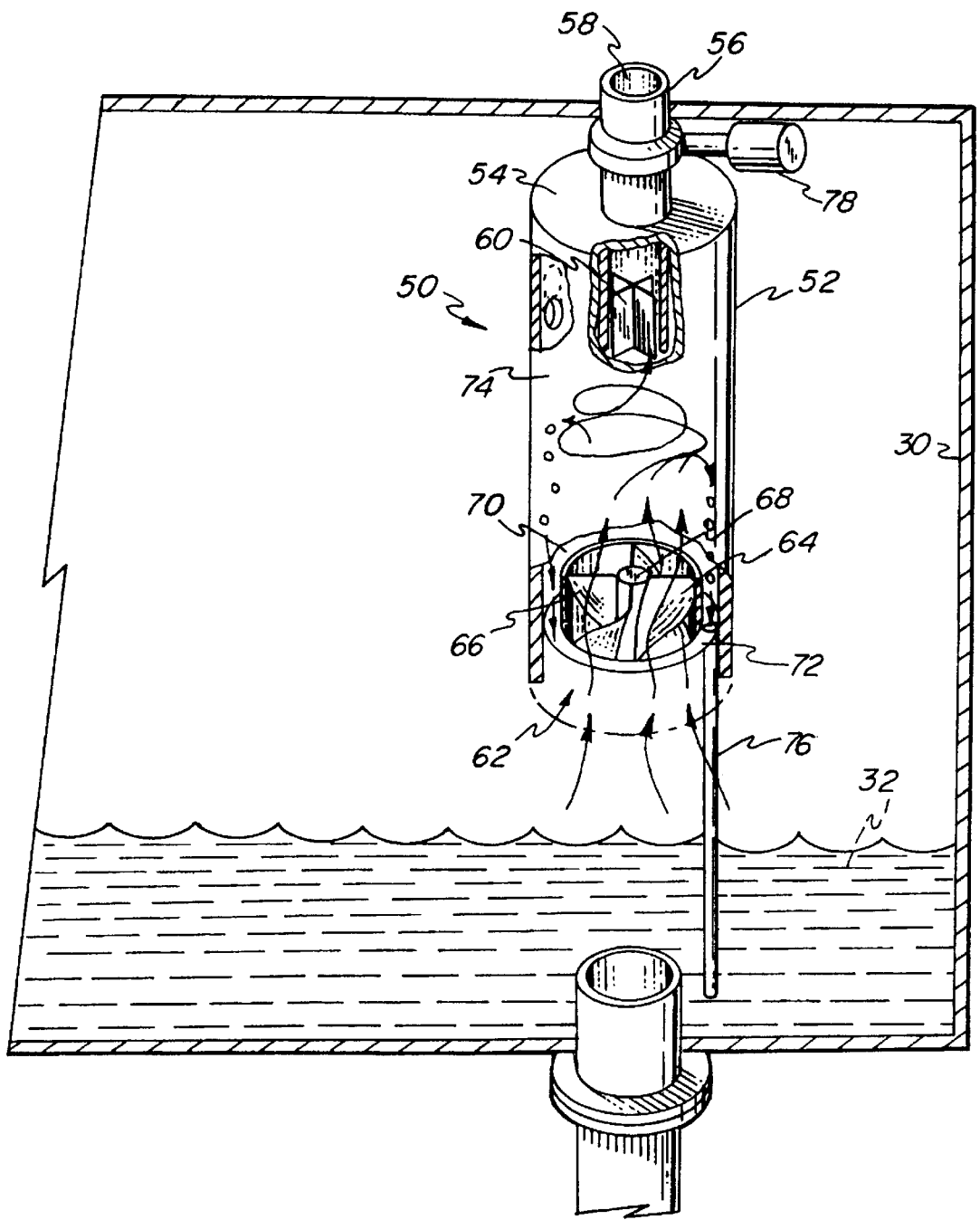
FIG. 2 is a view in side elevation of an embodiment of an improved mist eliminator in accordance with the present invention.

Turning now to FIG. 2, an improved mist eliminator in accordance with the invention is shown. As shown, the improved mist eliminator 50 comprises a substantially cylindrical housing 52 having a top wall 54 at an upper end with an axial tube 56 defining a gas outlet 58 therein. Preferably, positioned within the tube 56 are flow-straightening baffles 60, although the baffles 60 may be omitted. The improved mist eliminator 50 is oriented vertically with a gas/liquid inlet 62 oriented downwardly. Positioned within the inlet 62 substantially coaxially with the tube 56 is a vane assembly 64 including at least one helical vane 66 surrounding a cylindrical core 68 and preferably bounded by a cylindrical wall 70 extending the axial length of the vane 66. Preferably, vane assembly 64 includes three or four helical vanes 66. The exact structure of the vane assembly is not crucial to the invention so long as it imparts cyclonic motion to a gas/liquid mixture drawn through it.

Annular wall 72 is coaxial with and transverse to the vane assembly 64. It surrounds the vane assembly 64 between the cylindrical wall 70 and the housing 52. The housing 52, top wall 54, vane assembly 64, and annular wall 72 define a separation chamber 74. Annular wall 72 includes at least one drain tube 76 extending axially away from annular wall 72 and extending from the separation chamber 74 to the pulping liquor 32 level. Preferably, annular wall 72 is inclined from horizontal about fifteen degrees with a single drain tube 76 positioned at the lowest point thereof.

Also preferably, the annular wall 72 is dimensioned such that the wall 72, in combination with the housing 52, defines a substantially annular volume within the separation chamber 74 wherein droplets of mist and particles of foam separated from a gas/liquid mixture flowing from the inlet 62 to the outlet 58 may travel downwardly toward the annular wall 72 substantially without direct impingement thereon from the upwardly flowing gas mixture. For example, in a particularly preferred embodiment, the diameter of the vane assembly 64 is about 500 mm and the inner diameter of the housing 52 is about 813 mm.

As shown, the improved mist eliminator 50 is mounted in a receptacle 30 of a pulp washer a predetermined distance above a reservoir of pulping liquor 32. In operation, the intake of a blower or fan (not shown) is connected to tube 56 to draw a vacuum on outlet 58. Air in the receptacle 30 above the pulping liquor 32, with mist and foam entrained therein, is drawn upwardly through inlet 62, vane assembly 64, separation chamber 74, and straightening baffles 60 to outlet 58. Vane assembly 64 imparts swirling cyclonic motion to the gas/liquid mixture flowing therethrough. The resultant centrifugal forces act upon the denser particles to cause the particles to travel radially outwardly toward the housing 52 as the swirling gas/liquid mixture spirals upwardly toward the tube 56.

As the particles thus acted upon move outwardly, the particles enter a substantially annular volume of the separation chamber 74 wherein the axially upward velocity component of the gas/liquid mixture flow is greatly reduced, thereby allowing the separated particles to travel downwardly toward annular wall 72 substantially without resistance from the flowing gas/liquid mixture. The particles which collect on annular wall 72 then flow through drain tube 76 to be returned to the reservoir of pulping liquor 32. The gas/liquid mixture, now substantially free of droplets of mist and particles of foam, is drawn through the flow-straightening baffles 60, tube 56, and outlet 58 to the blower (not shown) to be delivered to a hood (not shown) to increase the pressure differential above a wire carrying a pulp mat (not shown). A valve 78 controls the flow of gas back to the intake of the blower.

Preferably, the improved mist eliminator 50 is mounted in the receptacle 30. This positioning minimizes the length of drain tube 76 necessary to return separated mist and foam to the pulping liquor 32. The mist eliminator 50 may for example be welded or attached directly to a sidewall of the receptacle 30, or it alternatively could be mounted on brackets or the like therein. Although the mist eliminator 50 is shown mounted within the receptacle 30, it is to be appreciated that it could also be spaced closely adjacent to the receptacle 30. The mist eliminator 50 could be mounted in, contiguous to, or closely adjacent the receptacle 30 or suction box provided that it is located upstream from the control valve 78. Secondary separation treatment devices such as baffles or a plurality of mist eliminators 50 can optionally be located downstream from the mist eliminator 50 and upstream of the valve 78.

The gas/liquid separator or mist eliminator 50 serves to separate foam and liquid from the gas that is to be recycled to the hood by the blower. Foam and liquid separation have become critically important as higher soap content pulps such as Southern Pine Kraft pulps are increasingly used and as washer throughput rates are increased. Although the mist eliminator 50 is herein described for use particularly in pulp washers, it is to be appreciated that the mist eliminator 50 may be used in similar apparatuses or processes where it is desirable to maintain a gas flow substantially free of undesired particles. One particular environment would be in the treatment of influent and effluent water from pulp and paper stock thickeners and the like.

Additionally, as apparent to the skilled artisan, defoaming agents, and other chemicals can be admitted to the process water in such washing and thickening devices. These chemical feeds can be made directly to the process water or they may be fed at the mist eliminator 50.

Figure 3:
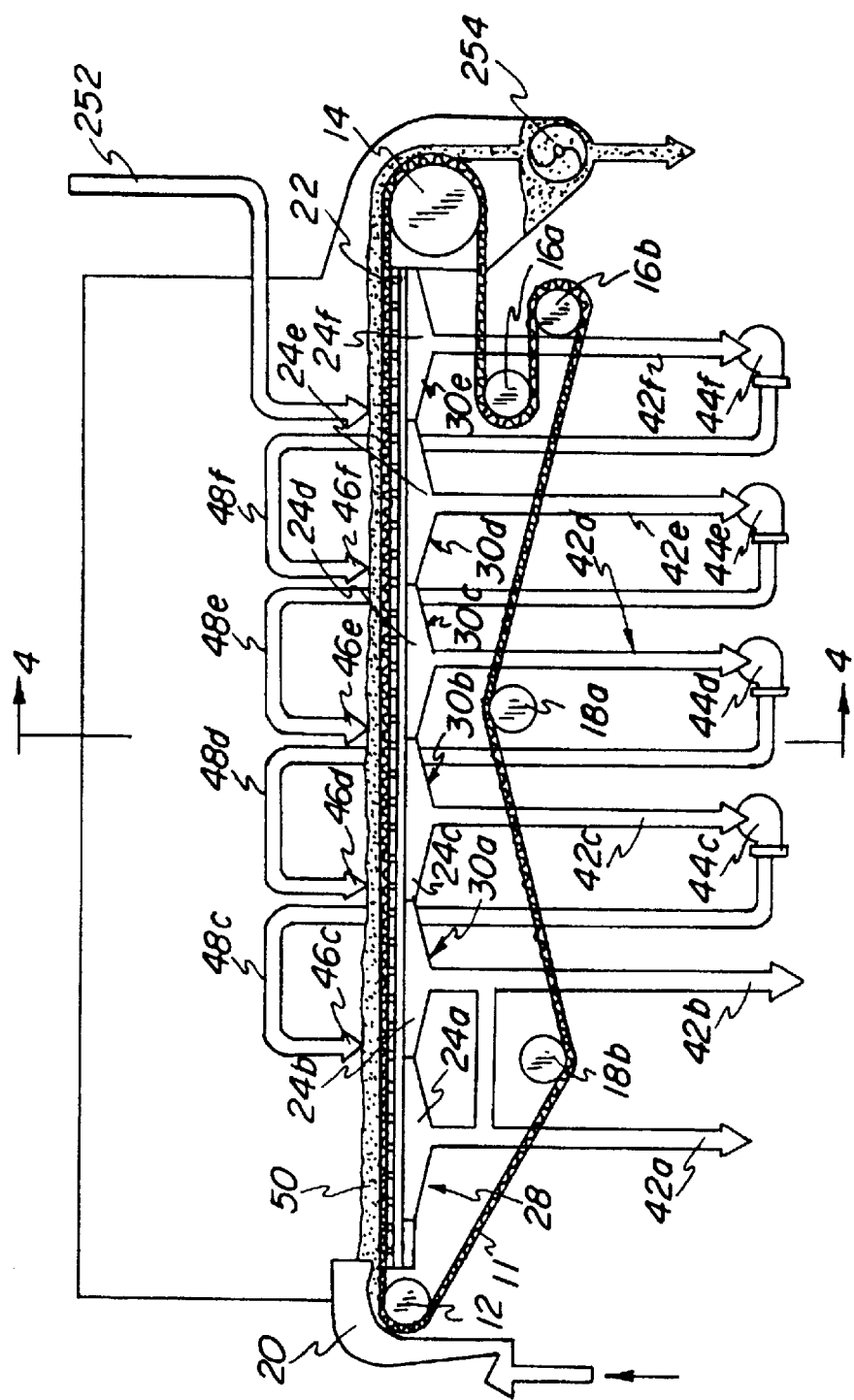
FIG. 3 is a view in side elevation representing a horizontal Ericsson-type of washer that may incorporate, as a component thereof, a mist eliminator in accordance with the invention.

Turning now to FIG. 3, there is shown diagrammatically a pulp washing apparatus and system in which the improved mist eliminator of the present invention may be advantageously employed.

Turning first to FIG. 3, there is shown a simplified schematic illustration of a Ericsson horizontal belt washer. As shown, an endless foraminous belt 11, usually a wire of woven plastic filaments, is trained around a breast roll 12 at the upstream wire run location, a couch roll 14 at the downstream run location and around drive rolls 16a, 16b, and tensioning rolls 18a, 18b on the return run of the belt to the upstream location. A headbox 20 deposits the pulp suspension to be washed onto the upstream end of the wire run.

A smooth, foraminous material 22 of low frictional coefficient such as a perforated polyethylene sheet is provided below and in supporting relation to the upper run of the wire 11. Disposed directly underneath the sheet and mounted on a frame (not shown) are a plurality of receptacles 24a–24f. Each of these is, in effect, a suction box, bounded at the top by the perforated sheet. As more fully explained in the Ericsson patent, the receptacles 24a–24f are interconnected and operated so that they form a series of successive zones along the path of the wire run comprising a formation zone 28 adjacent the headbox 20 and consecutive washing zones 30a–30e, the last of which 30e is adjacent the downstream end of the wire run.

A hood 40 is supported by a frame (not shown) and is positioned in enclosing relationship to the zones 28 and 30a–30e. As most clearly shown in FIG. 4, the hood provides a seal over the receptacles.

Turning back to FIG. 3, each of the receptacles is provided with a drain line 42a–f. Drain lines 42c–f communicate with pumps 44c–f to return liquid to shower heads 46c–f through liquid return lines 48c to 48f to provide wash water to effect displacement washing of the mat 50 of fibers as it travels from the upstream to downstream direction along the upper run of the wire 11. Clean water or white water is passed through line 252 so that the pulp mat adjacent the count roll is washed with relatively clean water. The washed pulp after leaving washing zone 30e exits the device via the assistance of auger 254.

Water drained from receptacle 24b through drain line 42b is forwarded to an evaporator tank, with water drained from upstream receptacle 42a forwarded to a blow tank. Lines 42a and 42b are connected via valve (not shown) so that water from line 42a may be directed to the evaporator if desired and, conversely water from line 42b could, if desired, be channeled to the blow tank.

In simplified form, the apparatus of FIG. 3 serves to evenly distribute pulp fed from the headbox onto the moving wire. In the formation zone 28, pulp is dewatered from inlet consistency to displacement consistency, forming a pulp mat. Receptacles 24a–e serve as suction boxes under the wire to collect the liquid passing therethrough.

Displacement washing of the mat occurs when the mat goes under the shower where the filtrate from each succeeding washing stage flows onto and through the pulp. The device depicted in FIG. 3 employs multiple stages of displacement washing, the number of which will depend on the furnish and the washing efficiency required. Dewatering and displacement of shower liquid is a function of the arrangement of the receptacle (suction box) pumps and a blower (explained thereinafter) and the hood.

Figure 4:
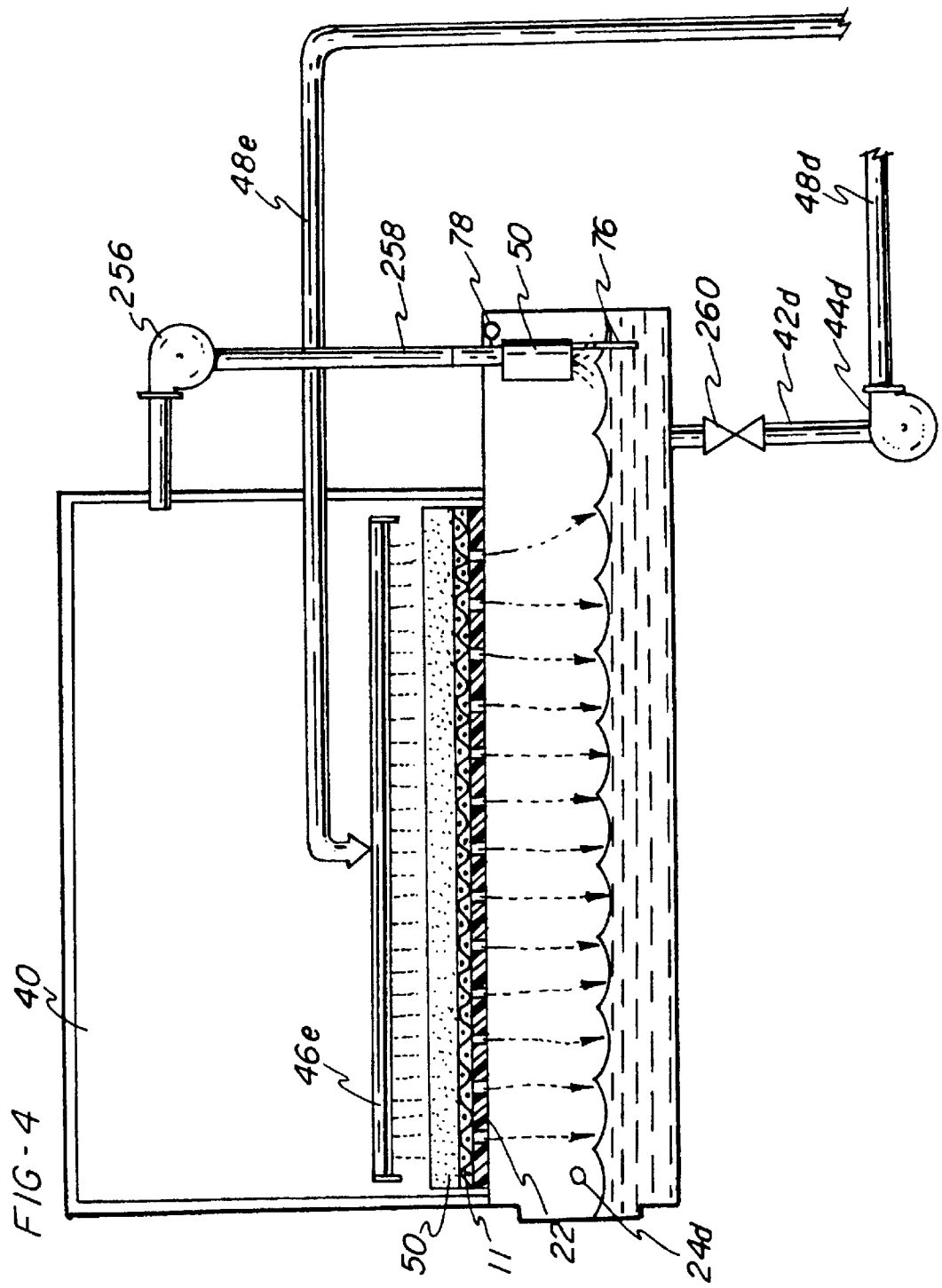
FIG. 4 is a cross-sectional view taken along the lines and arrows 4—4 of FIG. 3 and detailing the system location of the improved mist eliminator of the invention.

Turning now to FIG. 4 it can be seen that gas (usually air) is provided to the hood by means of blower 256. Air from each suction box is returned to the blower via line 258. A pressure differential of between about 1–4" Hg exists between the hood and the suction box atmosphere so that this pressure differential provides the driving force for the shower liquid to flow through the mat on the wire.

The hood maintains a seal between the atmosphere and the receptacle. The gauge value of the pressure in the hood may be positive, zero or negative depending on the desired washer operation. Filtrate from line 48e is used to provide wash water to shower head 46e. Filtrate from receptacle 24d is drained through line 42d where it is pumped by pump 44d to upstream shower head 48d (See FIG. 3). Line 42d is provided with a liquid level control valve 260 operatively associated with pump 44d to control the liquid level inside of the receptacle 24.

Disposed above the liquid level in receptacle 24d is liquid/gas separator 50 of the type shown in FIG. 2. Separator 50 is mounted in the receptacle 24d. Most importantly, drainage from the separator passes directly into the liquid in the receptacle 24d via drain tube 76. A valve 78 controls the flow of gas back to the suction side of blower 256.

Although separator 50 is shown mounted within suction box 24d, it is to be appreciated that it could also be spaced closely adjacent the box 24d. The term proximate as used herein is intended to cover mounted arrangements where the separator is mounted in, contiguous to, or closely adjacent the receptacle or suction box provided that it is located upstream from the control valve 78 (shown in FIG. 2). This disposition contrasts sharply with the disposition of the mist eliminators in prior art Ericsson devices in which the mist eliminators were located close to the fan or blower. In these prior art devices a plurality of receptacles were connected to the mist eliminator via a manifold arrangement and lengthy inlet or feed line to the mist eliminator.

The separator 50 serves to separate foam and liquid from the gas that is to be recycled to the hood by blower 256. Foam and liquid separation have become critically important as higher soap content pulps such as Southern Pine Kraft pulps are increasingly used and as washer throughput rates are increased.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a gas/liquid separator having a housing disposed along a generally longitudinally extending axis, a gas/liquid inlet and a gas outlet disposed at opposing ends of said housing along said axis and defining a separation chamber, and a cyclonic-flow-inducing vane assembly disposed in said inlet; the improvement comprising a wall positioned transverse to said vane assembly and disposed between said vane assembly and said housing, said wall inclined from said longitudinal axis and including at least one drain communicating with said chamber.

2. Improved gas/liquid separator as recited in claim 1 wherein said wall and said housing in combination define a volume within said chamber wherein droplets of liquid separated from a gas/liquid mixture flowing from said inlet to said outlet may travel toward said wall with reduced resistance from said flowing mixture.

3. Improved gas/liquid separator as recited in claim 1 wherein said at least one drain includes a substantially cylindrical tube means attached to said wall for transporting separated liquid away from said housing.

4. In a gas/liquid separator having a generally cylindrical housing disposed along a generally longitudinally extending axis, a gas/liquid inlet and a gas outlet disposed at opposing ends of said housing along said axis and defining a separation chamber, and a cyclonic-flow-inducing vane assembly disposed in said inlet, wherein a vacuum source is in communication with said outlet and said inlet is spaced a predetermined height above a body of liquid; the improvement comprising an annular wall transverse to said vane assembly disposed between said vane assembly and said housing, said annular wall inclined from said longitudinal axis and including at least one drain communicating between said chamber and a depth below a surface level of said body of liquid.

5. Improved gas/liquid separator as recited in claim 4 wherein said annular wall includes an inner radius of predetermined length such that said wall, in combination with said housing, defines a volume within said chamber wherein droplets of liquid separated from a gas/liquid mixture flowing from said inlet to said outlet may travel toward said wall with reduced resistance from said flowing mixture.

6. Improved gas/liquid separator as recited in claim 5 wherein said at least one drain includes a plurality of drains.

7. Improved gas/liquid separator as recited in claim 5 wherein said at least one drain includes a substantially cylindrical tube means for transporting separated liquid from said housing to said body of liquid.

8. In combination with a suction box of a pulp washer or thickener, a gas/liquid separator having a generally cylindrical housing, a gas/liquid inlet and a gas outlet disposed in said housing and defining a separation chamber therebetween, and a cyclonic-flow-inducing vane assembly disposed in said chamber, wherein a vacuum source is in communication with said outlet and said inlet is spaced a predetermined height above a body of liquid; the improvement comprising an annular wall transverse to said vane assembly disposed between said vane assembly and said housing, said annular wall including at least one drain communicating between said chamber and a depth below a surface level of said body of liquid.

9. Improved gas/liquid separator as recited in claim 8 wherein said annular wall and said housing together define a volume within said chamber wherein droplets of liquid separated from a gas/liquid mixture flowing from said inlet to said outlet may travel toward said wall substantially with reduced resistance from said flowing mixture.

10. Improved gas/liquid separator as recited in claim 8 wherein said at least one drain includes a plurality of drains.

11. Improved gas/liquid separator as recited in claim 9 wherein said at least one drain includes a substantially cylindrical tube means for transporting separating liquid from said housing directly into said body of liquid.

12. In a pulp washer having a horizontally disposed endless wire, drive means for moving said wire from an upstream to downstream direction, headbox means for feeding a pulp suspension to an upstream location on said wire, a suction box receptacle underlying said wire, water shower means positioned over said wire for directing a water shower over said wire and said pulp to wash said pulp whereby some of said water will drain into said suction box receptacle, and vacuum system means for creating suction under said wire to augment flow of wash water through said wire to said suction box receptacle; the improvement comprising a liquid/gas separator positioned proximate said suction box and draining liquid directly into said suction box said separator comprising a cylindrical housing and a plurality of swirl vanes radially disposed in said housing, and an annular rim member disposed around the inside of said cylindrical housing and surrounding said vanes, and at least one drain tube supported by said rim and immersed in said suction box.

13. Method for separating liquids existing in a gas stream in a processing apparatus having a suction box receptacle with a reservoir of liquid disposed therein, said method comprising:

(1) positioning a gas/liquid separator including a generally cylindrical housing along a longitudinal axis, a gas/liquid inlet and a gas outlet disposed at opposing ends of said housing to define a separation chamber therebetween, cyclonic-flow-inducing vane assembly disposed in said housing, an annular wall transverse to said vane assembly disposed between said vane assembly and said housing and inclined from said longitudinal axis and at least one drain in said annular wall in communication with said chamber, proximate said suction box receptacle such that said drain is in communication with said reservoir of liquid;

(2) drawing said gas stream through said gas/liquid separator; and (3) draining liquids from said separator into said reservoir of liquid.

* * * * *